United States Patent [19]

Opheij et al.

[11] 4,253,019

[45] Feb. 24, 1981

[54] APPARATUS FOR READING AN OPTICAL RECORD CARRIER HAVING A RADIATION-REFLECTING INFORMATION STRUCTURE

[75] Inventors: Willem G. Opheij; Jan E. van der Werf, both of Eindhoven, Netherlands

[73] Assignee: U.S. Philips Corporation, New York, N.Y.

[21] Appl. No.: 968,644

[22] Filed: Dec. 11, 1978

[30] Foreign Application Priority Data

Sep. 22, 1978 [NL] Netherlands ................ 7809635

[51] Int. Cl.³ ............................ G01J 1/20
[52] U.S. Cl. ..................... 250/201; 358/128.5
[58] Field of Search ............ 358/128; 179/100.3 V, 179/100.3 G; 250/201, 204

[56] References Cited

U.S. PATENT DOCUMENTS

| | | | |
|---|---|---|---|
| 3,971,002 | 7/1976 | Bricot et al. | 358/128 |
| 4,135,207 | 1/1979 | Greve et al. | 179/100.3 V |
| 4,143,402 | 3/1979 | Bricot et al. | 179/100.3 V |

Primary Examiner—David C. Nelms
Attorney, Agent, or Firm—Thomas A. Briody; William J. Streeter; Algy Tamoshunas

[57] ABSTRACT

An apparatus is described for reading a record carrier with an optical radiation-reflecting information structure. The path of the read beam includes a plane-parallel plate, whose surface area is substantially smaller than the cross-sectional area of the read beam, which plate ensures that the beam portion which passes through the plate cannot interfere with the rest of the read beam. After reflection by the record carrier the said beam portion passes through the radiation-deflecting element which deflects the beam portion to two radiation-sensitive detectors. The position of the radiation spot formed by the said beam portion is proportional to the degree of focussing of the read beam on the information structure.

9 Claims, 1 Drawing Figure

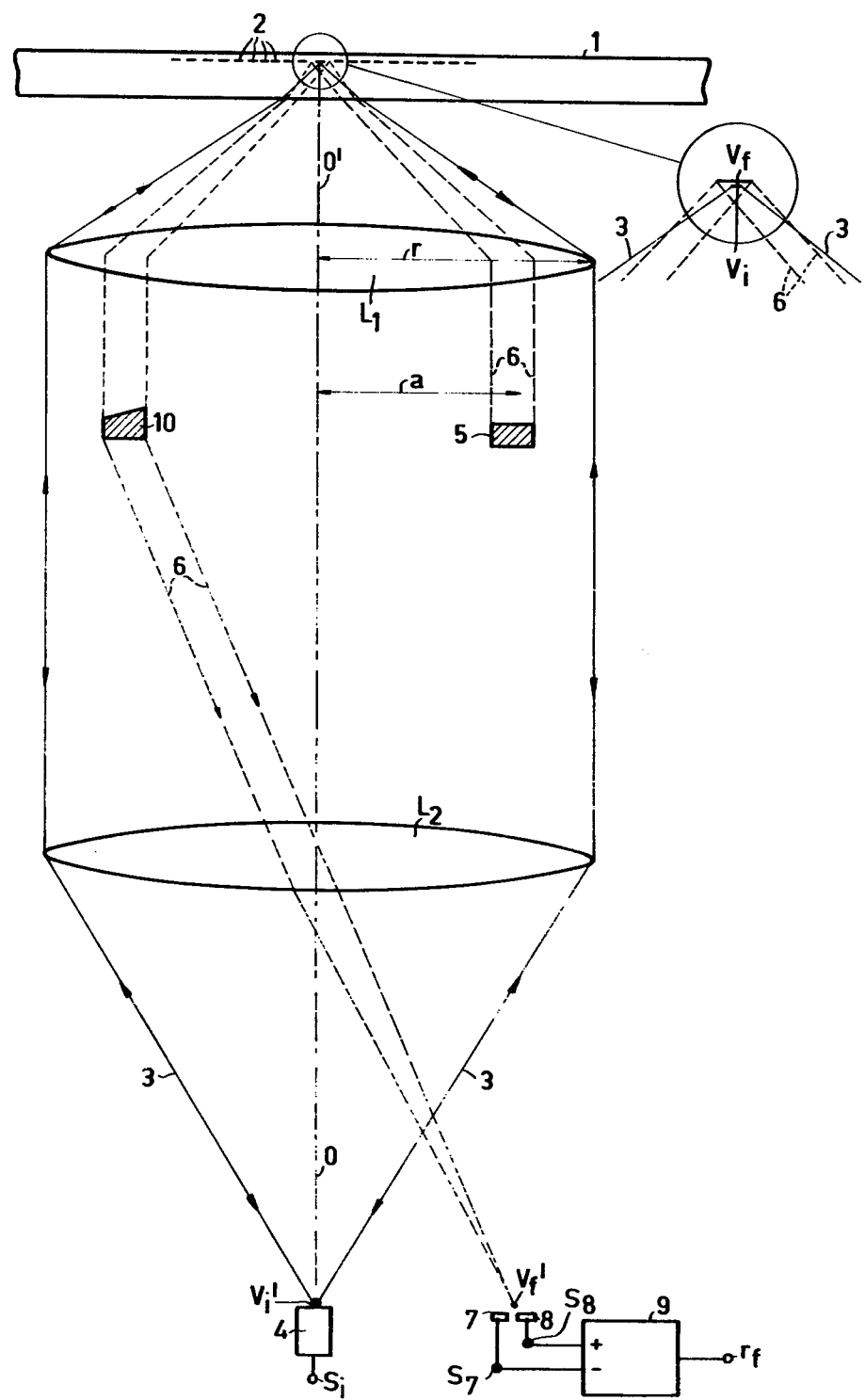

APPARATUS FOR READING AN OPTICAL RECORD CARRIER HAVING A RADIATION-REFLECTING INFORMATION STRUCTURE

The invention relates to an apparatus for reading an optical record carrier having a radiation reflecting and trackwise arranged information structure, which apparatus comprises a radiation source which produces a read beam, an objective system for passing the read beam via the information structure to a radiation-sensitive information detector whose output signal represents the information being read, and an optoelectronic focussing error detection system for determining a deviation between the desired and the actual position of the plane of focussing of the objective system. The focussing error detection system comprises two radiation sensitive focussing detectors, which co-operate with a narrow focussing beam, the difference in the output signals of the focussing detectors providing an indication of said deviation.

A focussing beam is to be understood to mean an auxiliary beam by means of which the focussing errors of the read beam can be detected. The focussing detectors are the radiation-sensitive detectors which co-operate with this auxiliary beam.

Such an apparatus is for example described in U.S. Pat. No. 3,876,841. This apparatus is for example used for reading a record carrier on which a (color) television program is stored. With limited dimensions of the record carrier the information details in the information structure will be very small, for example of the order of 1 $\mu$m, in order to obtain a sufficiently long playing time.

In order to enable such minute details to be read an objective system with a comparatively large numerical aperture is to be used. The depth of focus of such an objective system is small. As in the read apparatus variations in the distance between the plane of the information structure and the objective system may occur which are larger than the depth of focus, steps have to be taken which allow said variations to be detected and the focussing to be corrected. For this purpose a narrow focussing beam is employed which enters the objective system at a comparatively large distance from the optical axis of this system. The focussing beam forms an auxiliary radiation spot on the information structure. After the focussing beam has been reflected by the information structure it passes through the objective system for the second time and then forms a radiation spot, the focussing spot, in the plane of the two focussing detectors. The degree of symmetry of the focussing spot relative to the focussing detectors provides an indication of the degree of focussing of the focussing beam, and of the read beam, on the information structure.

The output signals of the focussing detectors are electronically processed into a control signal which is applied to a drive means, for example a moving coil, of the objective system, by which means the position of the objective system relative to the information structure is adjusted.

In accordance with U.S. Pat. No. 3,876,841 the focussing beam is obtained with the aid of a semitransparent mirror placed in the path of the read beam, which mirror reflects a part of the read beam to a fully reflecting mirror. On its way to the objective system the focussing beam then follows a path other than that followed by the read beam.

It has also been proposed to include a radiation-deflecting element in the path of the read beam on one side of the optical axis of the objective system, said element having an area which is substantially smaller than the cross-sectional area of the read beam. The radiation-deflecting element, which may be an optical wedge or a diffraction grating, ensures that a small part of the read beam is given another direction than the rest of this beam. Said part is used as focussing beam.

As the focussing beam fills only a small part of the pupil of the objective system, the auxiliary spot is substantially larger than the read spot. Cross-talk of the information structure in the focussing error signal is then virtually eliminated. However, the auxiliary spot is situated at some distance, for example 40–50 $\mu$m, from the read spot. As a result of this the said focussing error detection is dependent on a locally oblique position of the record carrier.

In order to reduce this dependence it has been proposed to place a radiation-deflecting element in the path of the read beam which is reflected by the information structure and which originates from the read spot, in such a way that the radiation-deflecting element deflects a part of the reflected read beam to the focussing detectors. Only one radiation spot on the information structure is then used both for reading the information and for generating a focussing error signal. The area on the information structure at which the read beam is focussed is then always the area being read. However, the focussing beam, and thus the output signals of the focussing detectors, are then always modulated by the information structure. The high-frequency modulations resulting from the scanning of the information details can be filtered out electronically. Inaccuracies in the information structure, which extend over a large number of information details, in particular a non-uniformity of the information areas, give rise to noise with a broad frequency band, which overlaps the frequency band of the focussing servosystem. Said noise gives rise to an unnecessary adjustment of the objective system. This manifests itself as an annoying rattling of the objective system and furthermore leads to unnecessary power consumption.

It is the object of the present invention to provide a read apparatus with a focussing error detection system, in which the focussing error signal is independent of locally oblique positions of the record carrier and is not affected by said broad-band noise. To this end the apparatus in accordance with the invention is characterized in that a radiation-transmitting plane-parallel plate, whose surface area is substantially smaller than the cross-sectional area of the read beam, is arranged in the radiation path of the read beam on one side of the optical axis of the objective system, for the formation of a focussing beam which has the same direction as the read beam and which does not interfere with the read beam, and that a radiation-deflecting element for deflecting the focussing beam to the focussing detectors is arranged in the path of the focussing beam which is reflected by the information structure.

If the read is substantially linearly polarized, the plane-parallel plate may be constituted by a $\lambda/2$ plate, whose principal direction makes an angle of approximately 45° with the direction of polarization of the read beam, $\lambda$ being the wavelength of the read beam. This plate rotates the direction of polarization of the part of the read beam used as focussing beam through 90° relative to the direction of polarization of the read beam.

If the radiation source is a semiconductor diode laser which emits a plurality of longitudinal modes, use can be made of a radiation-transmitting plane-parallel plate having a thickness of approximately m.N.L, where L represents the length of the laser resonant cavity and N the effective refractive index of the resonant cavity, while m is an odd number.

The invention is based on the recognition that by having a part of the read beam traverse a different optical pathlength or by giving this part a different direction of polarization, this part of the focussing beam can no longer interfere with the read beam on the information structure. Two radiation spots, a read spot and an auxiliary spot, are then formed on the information structure, whose centers coincide. As the auxiliary spot is formed by a beam portion which fills only a small part of the pupil of the objective system, the auxiliary spot is comparatively large and covers a large number of information details, so that the influence of these details on the focussing beam is averaged out.

The invention will now be described with reference to the accompanying FIGURE, which shows an embodiment of an apparatus in accordance with the invention in which the radiation source and the information detector constitute one unit.

The FIGURE is a schematic representation of a preferred embodiment of the invention.

The FIGURE shows a part of a round disk-shaped record carrier 1 in radial cross-section. The information structure is for example a phase structure and comprises a multitude of concentric or quasi-concentric tracks 2, which tracks consist of information areas which alternate with intermediate areas. The information areas may for example consist of pits in the record carrier surface or of hills which project from this surface. The information may for example be a color television program, but may also be other information, such as a large number of different images or digital information. Preferably, the information structure is disposed on the rear of the record carrier.

The record carrier is illuminated with a read beam 3 obtained from a diode laser 4. It is assumed that the laser emits linearly polarized radiation. This is especially so if the electric current through the laser substantially exceeds the so-called threshold current, i.e. the electric current at which the laser action is initiated. An objective system, which may comprise one lens system of, as is shown in the FIGURE, two lens systems $L_1$ and $L_2$, focusses the read beam to a read spot $V_i$ on the information structure. The read beam is reflected by the information structure and, as the record carrier rotates, it is modulated in accordance with the information stored in a track portion to be read. After reflection the read beam passes the objective system for the second time, an image $V'_i$ of the read spot $V_i$ being formed. At the location of the spot $V'_i$ a detector is situated, which converts the modulated read beam into an electrical signal $S_i$.

If the radiation source is a diode laser, this diode laser may also be used as information detector, as is described in inter alia German Patent Application No. 2.244,119. This is the case in the apparatus in accordance with the FIGURE and the numeral 4 designates a radiation-source/detection unit. Depending on the intensity of the reflected read beam, the electrical resistance of the diode laser or the intensity of the radiation emitted from the rear of the diode laser will vary. If a diode laser is used as radiation source no beam splitting element is necessary for separating the modulated read beam coming from the record carrier from the unmodulated read beam which is incident at the record carrier.

In accordance with the invention the path of the read beam 3 includes a so-called $\lambda/2$ plate 5, whose surface area is substantially smaller than the cross-sectional area of the read beam. The principal or fast direction of the plate 5 makes an angle of 45° with the direction of polarization of the read beam. The action of the plate may then be described as a mirror-inversion of the direction of polarization of the radiation passing through it relative to the fast direction of the plate. The direction of polarization of the beam portion 6 which passes through the plate 5, which portion is represented by the dashed lines in the FIGURE, is thus rotated through 90° relative to the direction of polarization of the rest of the read beam.

In the absence of the plate 5 the radiation of the beam portion 6, which radiation could not be distinguished from the radiation of the read beam 3, would interfere with the radiation of the read beam 3, and one diffraction-limited radiation spot would be formed on the information structure. As the beam portion 6 has a different direction of polarization than the read beam 3 if the plate 5 is present, the radiation of the beam portion 6 can no longer interfere with the radiation of the read beam. In addition to a read spot $V_i$ an auxiliary spot $V_f$ is then formed. The centers of these spots coincide, as is shown in the inset in the FIGURE.

The beam portion 6, hereinafter referred to as focussing beam, fills only a small part of the pupil of the objective system. As a result of this the auxiliary spot $V_f$ is substantially larger than the read spot $V_i$, and covers a large number of information areas and a number of information tracks at a time. The influence of the information areas and the tracks on the focussing beam, and thus on the focussing error signal, is thus averaged out. For the sake of simplicity the auxiliary spot $V_f$ is represented smaller than it is in reality.

A deflection element, in the form of an optical wedge 10, is arranged in the path of the focussing beam 6 which is reflected by the information structure. This wedge deflects the focussing beam in the direction of two radiation-sensitive focussing detectors 7 and 8. The lens systems $L_1$ and $L_2$ ensure that the focussing beam 6 is concentrated to a radiation spot, or focussing spot, $V'_f$ on the focussing detectors.

The optical elements are aligned so that if the distance between the plane of the information tracks 2 and the objective system $L_1L_2$ is correct, the radiation which is incident on the optical wedge has the direction indicated by dashed lines in the FIGURE. The optical wedge then deflects the focussing beam 6 in such a way that the focussing spot is symmetrical relative to the focussing detectors. These focussing detectors then receive equal amounts of radiation, and the output signals $S_7$ and $S_8$ of the detectors 7 and 8 are then equal.

If the plane of the information structure has moved relative to the objective system $L_1L_2$. The direction under which the beam 6 is incident on the wedge 10 changes in the preferred embodiment shown in the FIGURE, in which the elements 5 and 10 are disposed in the back focal plane of the lens system $L_1$. As a result of this the direction of the beam 6 which passes through the wedge 10 also changes and thus the position of the focussing spot $V'_f$ relative to the focussing detectors. If the plane of the information structure moves towards the objective system, the detector 7 will receive more radiation than the detector 8. However, if the plane of the information structure moves away from the objective system, the detector 7 will receive less radiation than the detector 8.

The signals $S_7$ and $S_8$ are applied to an electronic circuit 9. In this circuit the signals are subtracted from each other and processed to a focussing control signal $r_f$ in a manner known per se. By means of the last-mentioned signal the objective system may for example be moved along the optical axis $00'$ until the signals $S_7$ and $S_8$ are equal to each other. If the radiation source is a diode laser and this laser, together with the objective system and the focussing detectors, is accommodated in one small and light weight tube, the entire tube may be moved along the optical axis so as to correct the focussing.

Instead of a semiconductor diode laser it is alternatively possible to employ a gas laser, for example a helium-neon laser, as radiation source, provided that the read beam is linearly polarized. When a gas laser is used a separate information detector must be employed and the read beam which has been reflected and modulated by the information structure must be separated from the read beam which is incident on the record carrier.

An apparatus in accordance with the FIGURE in which the angle between the principal direction of the $\lambda/2$ plate and the direction of polarization of the linearly polarized beam 3 is 45°, is a preferred embodiment. An apparatus in which the said angle is not exactly 45° or in which the read beam 3 is not exactly linearly polarized also operates satisfactorily, although a small amount of cross-talk occurs, which is still acceptable.

The plate 5 serves to ensure that the centers of the read spot $V_i$ and of the auxiliary spot $V_f$ substantially coincide. An apparatus in accordance with the invention in which the plate 5 is not exactly plane-parallel, so that there is a small distance, for example of the order of 1 $\mu$m, between these centers, also operates satisfactorily.

In a second embodiment of a device in accordance with the invention the plate 5 is for example made of glass or plastic and this plate has a specific optical thickness. The beam portion 6 which traverses the plate then covers a different optical pathlength than the rest of the read beam. The beam portion 6, the focussing beam, can then no longer interfere with the read beam, and again a small read spot $V_i$ and a comparatively large auxiliary spot $V_f$ are formed on the information structure.

Use is then made of a special property of a semiconductor diode laser. Such a laser is described in: "Philips' Technical Review", 36(1976), pages 190–200. A diode laser, in particular when it is operated with an electric current which approximates its threshold current, can emit radiation in an number of so-called longitudinal modes, i.e. not one wavelength but a plurality of wavelengths are emitted. For all longitudinal modes the relationship: $n_i\lambda_i = 2$ N·L is valid, where L represents the length of the laser resonant cavity and N the effective refractive index in this cavity, while $\lambda_i$ is the wavelength of a mode and $n_i$ and integer of the order of one thousand.

As a result of this limitation imposed on the wavelength of the laser light, the extent to which the beam portions interfere, when the laser beam is split into two beam portions which are subsequently recombined, will depend on the difference in the optical pathlengths covered by the beam portions. Indeed, for a pathlength difference of an even number of times N·L either destructive or constructive interference will occur for all longitudinal modes simultaneously. This results in a deep modulation in the interference pattern. However, if the pathlength difference is an odd number of times N·L, the interference for consecutive modes (i, i+1, etc.) is alternately constructive and destructive. As a result of this the modulation in the interference pattern will be eliminated. When the optical thickness of the plate 5 is then equal to an odd number of times N·L the radiation of the beam portion 6 which is passed through said plate is no longer correlated to the radiation of the rest of the read beam, so that no longer any interference occurs at the location of the information structure.

The relationship: $(N' - 1) D = m \cdot N \cdot L$ is then valid for the plate 5, where $N'$ is the refractive index of the plate, D the geometrical thickness of the plate and m an odd number. In an embodiment of an apparatus in accordance with the invention in which a diode laser with N=3.6 and L=0.28 mm was used, the thinnest possible (m=1) glass plate 5, for which n=1.5, had a thickness of approximately 2 mm.

The wedge 10 should be disposed in the shadow of the plate 5, which shadow is formed by the lens L and the record carrier.

Instead of a wedge it is also possible to employ a diffraction grating to aim the focussing beam at the focussing detectors. The elements 5 and 10 may be cemented onto one transparent plate diametrically opposite to one another.

If the plane of the elements 5 and 10 were situated at an arbitrary height between the lens systems $L_1$ and $L_2$, the location of the shadow of the plate 5 would depend on the distance between the plane of the information structure and the objective system. Therefore, in accordance with the invention, care must be taken that the plane of the elements 5 and 10 coincides with the focal plane of the lens system $L_1$, so that these elements are imaged on each other via the lens systems $L_1$ and the record carrier.

Furthermore, care is taken that the distance a between the optical axis $00'$ and the center of the focussing beam 6 is approximately 0.7 times the radius r of the pupil of the lens L. For the read method illustrated in the FIGURE, where the read beam traverses the record carrier twice, the influence of spherical aberration in the objective system on the shape of the spot $V_i$ is minimal if the thickness of the record carrier varies when using the focussing error detection described.

The bounding line of the focussing detectors preferably makes an acute angle, for example 45°, with the direction in which the focussing spot $V'_f$ moves when the position of the plane of information structure varies. Thus, it is prevented that the focussing control signal $r_f$ greatly depends on the position, in the said direction, of the focussing detectors. This facilitates adjustment of the focussing error detection system during assembly of the read apparatus.

In the case of a correct focussing of the read beam the focussing spot $V'_f$ can be symmetrized relative to the focussing detectors by rotating the plate on which the elements 5 and 10 are elemented about the optical axis $00'$.

As the elements 5 and 10 are disposed in the path of the read beam which is directed towards the record carrier, the read spot $V_i$ will be slightly elongate in the direction of the connecting line of the elements 5 and 10. In this direction the resolution of the read beam is then slightly smaller than in the direction perpendicular thereto. The influence of this, in itself minor, effect may be reduced by ensuring that the connecting line between the elements 5 and 10 makes an angle of approximately 45° with the direction of a track portion to be read.

What is claimed is:

1. An improved apparatus for reading an optical record carrier having a radiation reflecting and trackwise arranged information structure, which apparatus comprises a radiation source which produces a read beam, an objective system for passing the read beam via the information structure to a radiation-sensitive information detector whose output signal represents the information being read, and an opto-electronic focussing-error detection system for determining a deviation between the desired and the actual position of the plane of focussing of the objective system, which focussing-error detection system comprises two radiation-sensitive focussing detectors which co-operate with a narrow focussing beam, the difference in the output signals of the focussing detectors providing an indication of said deviation, the improvement comprising a radiation-transmitting plane-parallel plate, whose surface area is substantially smaller than the cross-sectional area of the read beam arranged in the radiation path of the read beam on one side of the optical axis of the objective system for forming a focussing beam which has the same direction as the read beam and which, due to a phase delay imparted by said plate does not interfere with the read beam, and a radiation-deflecting element for deflecting the focussing beam to the focussing detectors arranged in the path of the focussing beam which is reflected by the information structure.

2. An apparatus as claimed in claim 1, in which the read beam has a particular wavelength and is a substantially linearly polarized beam polarized in a particular direction, characterized in that the plane-parallel plate is a $\lambda/2$ plate whose principal direction makes an angle of approximately 45° with the direction of polarization of the read beam, $\lambda$ being the wavelength of the read beam.

3. An apparatus as claimed in claim 1, in which the radiation source is a semiconductor diode laser which emits a plurality of longitudinal modes, characterized in that the plane-parallel plate has an optical thickness of approximately $m \cdot N \cdot L$, where L represents the length of the laser resonant cavity, N the effective refractive index within said cavity, and m an odd number.

4. An apparatus as claimed in claim 1, characterized in that the radiation-deflecting element is constituted by a diffraction grating.

5. An apparatus as claimed in claim 1, characterized in that the radiation-deflecting element is constituted by an optical wedge.

6. An apparatus as claimed in claim 1, 2 or 3, characterized in that the plane-parallel plate and the radiation-deflecting element are disposed in the back focal plane of a lens system of the objective system which is nearest the record carrier.

7. An apparatus as claimed in claim 1, 2 or 3, characterized in that the distance between the optical axis of the objective system and the center of the plane-parallel plate is approximately 0.7 times the radius of the pupil of the objective system.

8. An apparatus as claimed in claim 1, 2 or 3, characterized in that the bounding line between the focussing detectors makes an acute angle with the direction in which the radiation spot formed in the plane of the focussing detectors moves as a result of focussing errors.

9. An apparatus as claimed in claim 1, characterized in that the connecting line of the centers of the plane-parallel plate and the radiation-deflecting element makes an angle of approximately 45° with the direction in which an information track of the record carrier is read.

* * * * *

UNITED STATES PATENT AND TRADEMARK OFFICE
CERTIFICATE OF CORRECTION

PATENT NO. : 4,253,019
DATED : February 24, 1981
INVENTOR(S) : WILLEM GERARD OPHEIJ AND JAN E. VAN DER WERF It is certified that error appears in the above—identified patent and that said Letters Patent is hereby corrected as shown below:

Claim 1, line 6, change "rediation" to --radiation--

Claim 9, line 1, change "claim 1" to --claims 1, 2 or 3--

Signed and Sealed this

Twenth-eighth Day of September 1982

[SEAL]

Attest:

GERALD J. MOSSINGHOFF

Attesting Officer    Commissioner of Patents and Trademarks